United States Patent
Kim et al.

(10) Patent No.: US 11,258,486 B2
(45) Date of Patent: Feb. 22, 2022

(54) METHOD FOR TRANSMITTING SIGNAL IN WIRELESS COMMUNICATION SYSTEM AND APPARATUS FOR SAME

(71) Applicant: LG ELECTRONICS INC., Seoul (KR)

(72) Inventors: Youngtae Kim, Seoul (KR); Hanbyul Seo, Seoul (KR); Jiwon Kang, Seoul (KR); Kijun Kim, Seoul (KR); Seungmin Lee, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 538 days.

(21) Appl. No.: 16/317,811

(22) PCT Filed: Jul. 24, 2017

(86) PCT No.: PCT/KR2017/007934
§ 371 (c)(1),
(2) Date: Jan. 14, 2019

(87) PCT Pub. No.: WO2018/016926
PCT Pub. Date: Jan. 25, 2018

(65) Prior Publication Data
US 2021/0306038 A1   Sep. 30, 2021

Related U.S. Application Data

(60) Provisional application No. 62/365,398, filed on Jul. 22, 2016.

(51) Int. Cl.
*H04B 7/0456* (2017.01)
*H04L 5/00* (2006.01)

(52) U.S. Cl.
CPC ......... *H04B 7/0456* (2013.01); *H04L 5/0048* (2013.01)

(58) Field of Classification Search
CPC .......... H04B 7/04; H04B 7/06; H04B 7/0456; H04L 1/18; H04L 5/00; H04L 5/0048;
(Continued)

(56) References Cited

U.S. PATENT DOCUMENTS

2011/0200143 A1   8/2011   Koo et al.
2012/0320874 A1   12/2012  Li et al.
(Continued)

FOREIGN PATENT DOCUMENTS

CN   105308880   2/2016
CN   105634574   6/2016
(Continued)

OTHER PUBLICATIONS

PCT International Application No. PCT/KR2017/007934, Written Opinion of the International Searching Authority dated Nov. 29, 2017, 20 pages.
(Continued)

*Primary Examiner* — Shawkat M Ali
(74) *Attorney, Agent, or Firm* — Lee Hong Degerman Kang Waimey

(57) ABSTRACT

The present invention relates to a method for transmitting a signal by a terminal in a wireless communication system supporting multiple input multiple output (MIMO), the method comprising the steps of: notifying a base station of a particular serving beam selected on the basis of a reference signal; determining reception vectors for one or more beams including the particular serving beam received from the base station; and transmitting a sounding reference signal (SRS)
(Continued)

configured from a predetermined number of ports to the base station by applying precoding on the basis of the reception vectors.

5 Claims, 5 Drawing Sheets

(58) Field of Classification Search
CPC .......... H04L 25/02; H04L 27/04; H04W 4/00; H04W 24/00; H04W 24/10; H04W 36/00; H04W 72/04; H04W 72/08
USPC ........ 370/252, 328, 329, 330, 331; 375/219, 375/260, 267, 295, 316
See application file for complete search history.

(56) References Cited

U.S. PATENT DOCUMENTS

| | | | |
|---|---|---|---|
| 2013/0083683 A1 | 4/2013 | Hwang et al. | |
| 2013/0286960 A1* | 10/2013 | Li | H04W 72/042 370/329 |
| 2014/0112168 A1 | 4/2014 | Chen et al. | |
| 2015/0009951 A1 | 1/2015 | Josiam et al. | |
| 2015/0236772 A1 | 8/2015 | Hammarwall et al. | |
| 2015/0236774 A1 | 8/2015 | Son et al. | |
| 2016/0080060 A1 | 3/2016 | Yu et al. | |

FOREIGN PATENT DOCUMENTS

| | | |
|---|---|---|
| EP | 2887558 | 6/2015 |
| KR | 1020150097939 | 8/2015 |
| WO | 2015143898 | 10/2015 |

OTHER PUBLICATIONS

European Patent Office Application Serial No. 17831398.7, Search Report dated Jan. 8, 2020, 9 pages.

Blockey et al., "Encyclopedia of Aerospace Engineering: vol. 5—Dynamics and Control," Beijing Institute of Technology Press, Jun. 2016, 8 pages.

* cited by examiner

FIG. 2
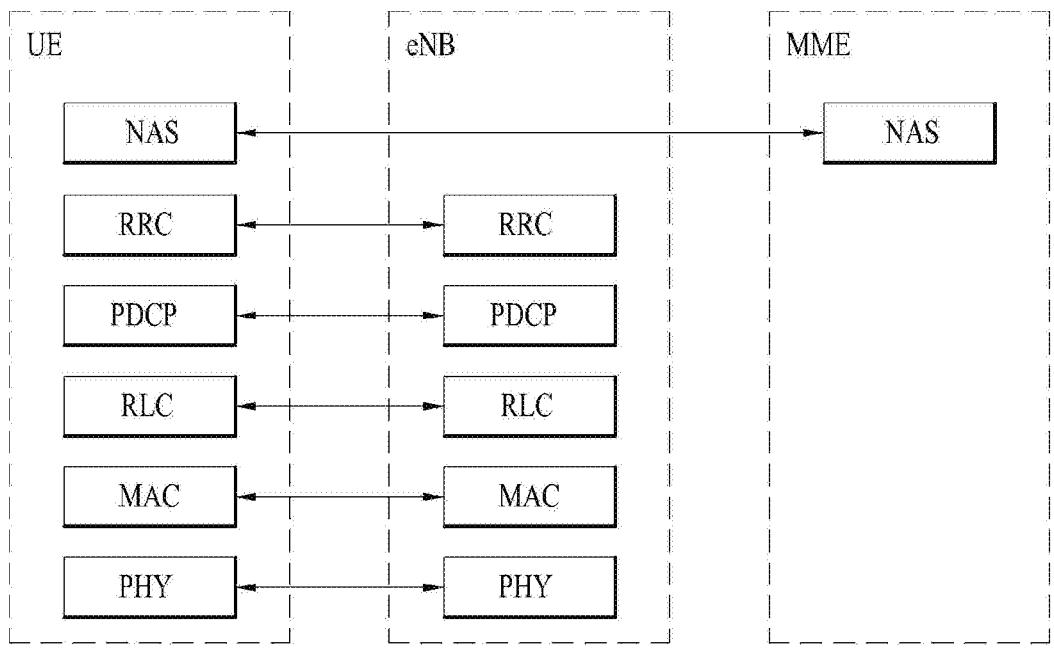
(a) Control plane protocol stack
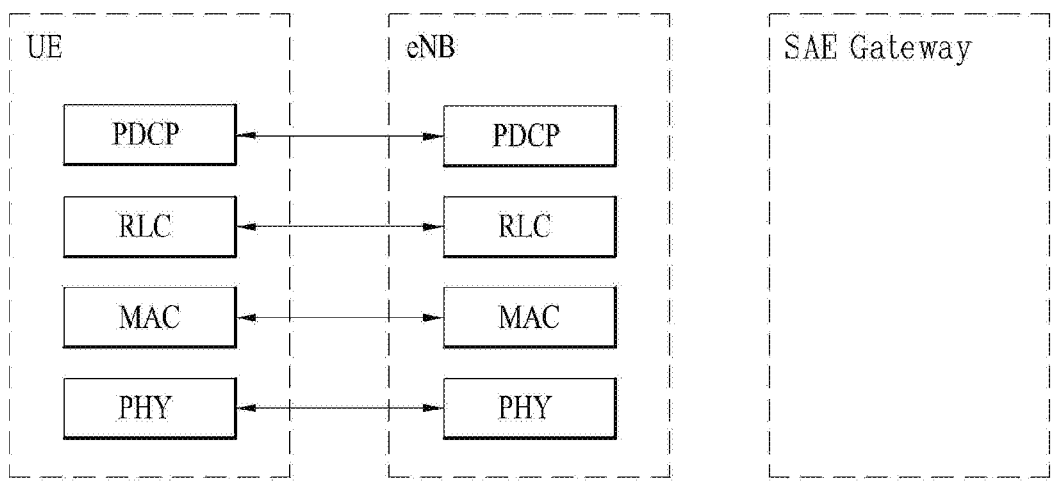
(b) User plane protocol stack

METHOD FOR TRANSMITTING SIGNAL IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2017/007934, filed on Jul. 24, 2017, which claims the benefit of U.S. Provisional Application No. 62/365,398, filed on Jul. 22, 2016, the contents of which are all hereby incorporated by reference herein in their entirety.

TECHNICAL FIELD

The present invention relates to a wireless communication system, and more particularly, to a method for transmitting a signal in a wireless communication system and an apparatus for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.25, 2.5, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

Based on the discussion above, a method for transmitting a signal in a wireless communication system and an apparatus for the same are proposed below.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In one aspect of the present invention to solve the aforementioned problem, a method for transmitting a signal by a terminal in a wireless communication system supporting Multiple Input Multiple Output (MIMO) includes informing a base station of a specific serving beam selected based on a reference signal, determining receive vectors for at least one beam including the specific serving beam received from the base station, and transmitting a sounding reference signal (SRS) configured with a predetermined number of ports to the base station by applying precoding based on the received vectors.

In addition, the predetermined number may be determined by radio resource control (RRC) signaling.

Further, the at least one beam may include the specific serving beam and at least one neighboring beam neighboring the specific serving beam.

Further, the receive vector may be calculated based on one of an analog beam, a hybrid beam combining an analog beam and a digital beam, and an antenna group.

Further, the at least one beam may be configured by a beam set configured by the base station, wherein the neighboring beam may be determined based on a highest order of proximity to the specific serving beam.

Further, the at least one beam may be indicated by an index received from the base station.

Further, the receive vector is signaled from the base station.

Further, the receive vector may be determined according to a best serving beam measured by the terminal and corresponding to the predetermined number.

Further, information on the specific serving beam may be indicated by the base station on a control channel.

Further, when it is determined that the specific serving beam is being changed quickly, the SRS to which the predetermined number of ports are cyclically applied may be transmitted. The predetermined number of ports may be a total number of at least one port associated with each of the at least one beam.

The method may further include performing uplink precoding by cycling the predetermined number of ports on a resource group-by-resource group basis.

In another aspect of the present invention to solve the aforementioned problem, a terminal for transmitting a signal in a wireless communication system supporting Multiple Input Multiple Output (MIMO) includes a radio frequency unit, and a processor coupled to the radio frequency unit to control signal transmission and reception, the processor is configured to inform a base station of a specific serving beam selected based on a reference signal, to determine receive vectors for at least one beam including the specific serving beam received from the base station, and to transmit a sounding reference signal (SRS) configured with a predetermined number of ports to the base station by applying precoding based on the received vectors.

Advantageous Effects

According to an embodiment of the present invention, signal transmission may be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates control plane and user plane structures of a radio interface protocol between a UE and an E-UTRAN on the basis of the 3GPP wireless access network standard.

BEST MODE

Figure 1:
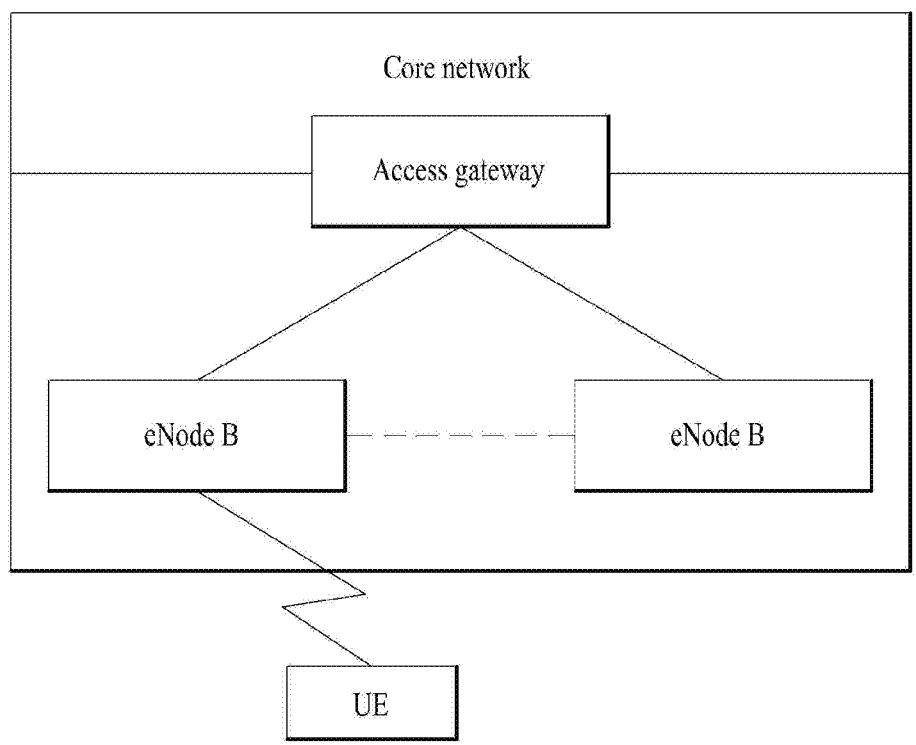
FIG. 1 schematically illustrates an E-UMTS network structure as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). CDMA may be implemented by radio technology such as UTRA (universal terrestrial radio access) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, and evolved UTRA (E-UTRA). UTRA is a part of a universal mobile telecommunications system (UMTS). 3rd generation partnership project long term evolution (3GPP LTE) is a part of evolved UMTS (E-UMTS) that uses E-UTRA, and adopts OFDMA in downlink and SC-FDMA in uplink. LTE-advanced (LTE-A) is an evolved version of 3GPP LTE.

For clarification of the description, although the following embodiments will be described based on 3GPP LTE/LTE-A, it is to be understood that the technical spirit of the present invention is not limited to 3GPP LTE/LTE-A. Also, specific terms hereinafter used in the embodiments of the present invention are provided to assist understanding of the present invention, and various modifications may be made to the specific terms within the range that they do not depart from the technical spirit of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
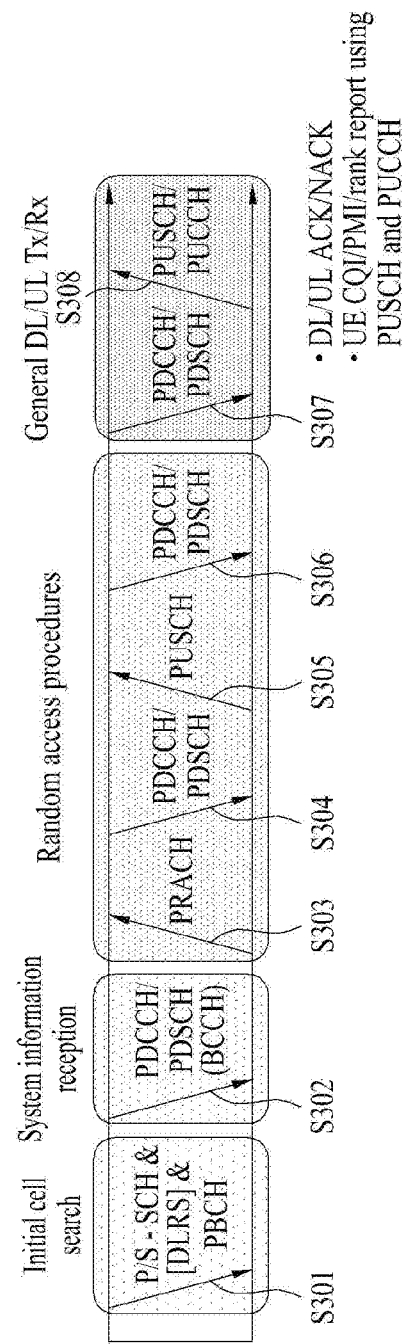
FIG. 3 illustrates physical channels used in a 3GPP system and a general signal transmission method using the same.

FIG. 3 illustrates physical channels used in a 3GPP system and a general method for transmitting a signal using the physical channels.

A user equipment (UE) performs initial cell search such as synchronizing with a base station when it newly enters a cell or the power is turned on (S301). To this end, the UE synchronizes with the base station by receiving a primary synchronization channel (P-SCH) and a secondary synchronization channel (S-SCH) from the base station, and acquires information such as cell ID, etc. Afterwards, the UE may acquire broadcast information within the cell by receiving a physical broadcast channel (PBCH) from the base station. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH (S302).

The UE may perform a random access procedure (RACH) to complete access to the base station when the UE initially accesses the BS or has no radio resources for signal transmission (S303 to S306). To this end, the UE may transmit a specific sequence through a preamble over a physical random access channel (PRACH) (S303 and S305) and may receive a response message to the preamble through the PDCCH and the PDSCH corresponding to the PDCCH (S304 and S306). In the case of a contention based RACH, the UE may additionally perform a contention resolution procedure.

Having performed the above described procedures, the UE may be able to perform a PDCCH/PDSCH reception (S307) and a PUSCH/PUCCH (physical uplink shared channel/physical uplink control channel) transmission (S308) as a general uplink/downlink signal transmission procedure. Particularly, the UE receives downlink control information (DCI) through the PDCCH. Here, DCI includes control information such as resource allocation information about the UE and has a format depending on purpose of use. Control information transmitted from the UE to the base station on uplink or transmitted from the base station to the UE includes a downlink/uplink ACK/NACK signal, a channel quality indicator (CQI), a precoding matrix index (PMI), a rank indicator (RI), etc. In 3GPP LTE, the UE can transmit the control information such as CQI/PMI/RI through a PUSCH and/or a PUCCH.

Figure 4:
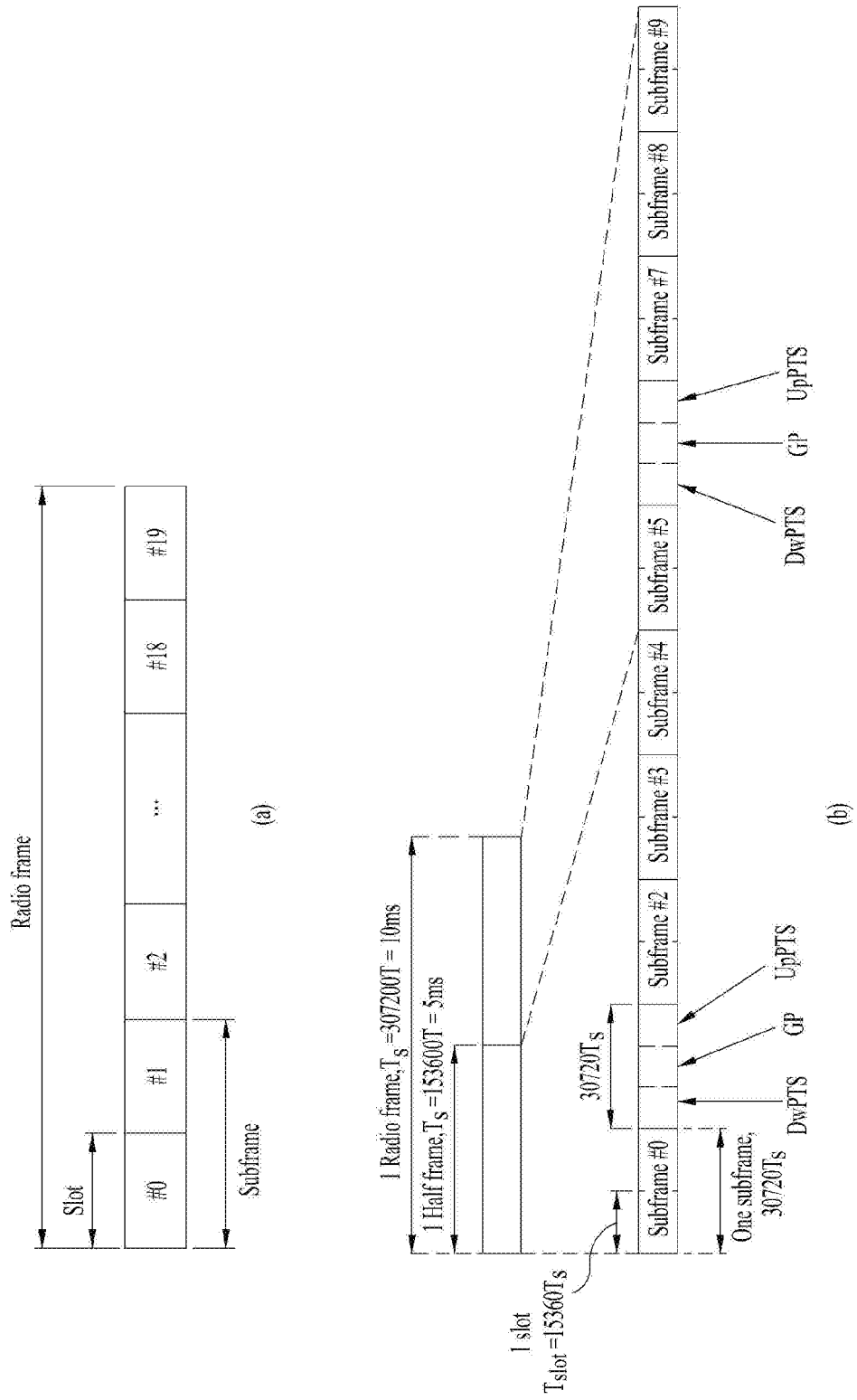
FIG. 4 illustrates a radio frame structure used in LTE.

FIG. 4 illustrates a structure of a radio frame used in LTE.

Referring to FIG. 4, in a cellular OFDM wireless packet communication system, transmission of an uplink/downlink data packet is performed on a subframe by subframe basis and one subframe is defined as a specific period including a plurality of OFDM symbols. 3GPP LTE standards support a type-1 radio frame structure applicable to FDD (Frequency Division Duplex) and a type-2 radio frame structure applicable to TDD (Time Division Duplex).

FIG. 4(a) illustrates the type-1 radio frame structure. A downlink radio frame includes 10 subframes, each of which includes two slots in the time domain. A time taken to transmit one subframe is called a TTI (transmission time interval). For example, one subframe may be 1 ms in length and one slot may be 0.5 ms in length. One slot includes a plurality of OFDM symbols in the time domain and a plurality of resource blocks (RBs) in the frequency domain. 3GPP LTE uses OFDMA on downlink and thus an OFDM symbol refers to one symbol period. An OFDM symbol may also be referred to as an SC-FDMA symbol or a symbol period. An RB as a resource allocation unit may include a plurality of consecutive subcarriers in one slot.

The number of OFDM symbols included in one slot may depend on a CP (Cyclic Prefix) configuration. The CP includes an extended CP and a normal CP. For example, when the OFDM symbol is configured according to the normal CP, the number of OFDM symbols included in one slot may be 7. When the OFDM symbol is configured according to the extended CP, the length of one OFDM symbol increases and thus the number of OFDM symbols included in one slot is less than that in the case of the normal CP. In the extended CP, for example, the number of OFDM symbols included in one slot can be 6. In the case of unstable channel state such as rapid movement of a UE at a high speed, the extended CP can be used to reduce inter-symbol interference.

When the normal CP is used, one slot includes 7 OFDM symbols and thus one subframe includes 14 OFDM symbols. Here, a maximum of three OFDM symbols located in a front portion of each subframe may be allocated to a PDCCH (Physical Downlink Control Channel) and the remaining symbols may be allocated to a PDSCH (Physical Downlink Shared Channel).

FIG. 4(b) illustrates the type-2 radio frame structure. The type-2 radio frame includes two half frames and each half frame is composed of four normal subframes each of which includes two slots and a special subframe including two slots, a DwPTS (Downlink Pilot Time Slot), a GP (Guard Period) and a UpPTS (Uplink Pilot Time Slot).

In the special subframe, the DwPTS is used for initial cell search, synchronization or channel estimation in a UE. The UpPTS is used for channel estimation and uplink transmission synchronization of a UE in a BS. That is, the DwPTS is used for downlink transmission and the UpPTS is used for uplink transmission. Particularly, the UpPTS is used for transmission of a PRACH preamble or SRS. The GP is used to eliminate interference generated on uplink due to multipath delay of a downlink signal between uplink and downlink.

With respect to the special subframe, a configuration is currently defined in 3GPP standard document as shown in Table 1. Table 1 shows DwPTS and UpPTS when $T_s=1/(15000 \times 2048)$ and the remaining period is set to a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The type-2 radio frame structure, that is, an uplink/downlink (UL/DL) configuration in a TDD system is shown in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe and S represents the special subframe. In addition, Table 2 shows downlink-to-uplink switching periodicity in a UL/DL subframe configuration in each system.

The aforementioned radio frame structure is merely an example and the number of subframes included in a radio frame, the number of slots included in a subframe and the number of symbols included in a slot may be varied.

Hereinafter, a beam switching technique using a precoded SRS for the new RAT-based MIMO technology as proposed in the present invention will be described based on the description above.

In new RAT-based MIMO, a process of selecting beams for a UE before the base station configures the CSI-RS is considered. That is, the UE is pre-allowed through a specific reference signal (e.g., a discovery reference signal (DRS), a beam reference signal (BRS)) to select a corresponding beam, and downlink transmission is performed through the selected beam or a precoded CSI-RS port to which the selected beam is applied is indicated. This is intended to perform downlink transmission by selecting precoding more suitable for the UE.

Hereinafter, for simplicity, a beam selected using a specific reference signal is defined as a serving beam. The basic rule for the serving beam is that a wide beam shall be selected to apply the serving beam semi-statically to the UE, rather than quickly adapting the beam.

However, for a service such as V2X, a UE moving at 500 km/h should also be considered, and thus serving beams may be changed more quickly. If the UE does not recognize a changed serving beam, but uses the previously selected serving beam, the UE may degrade system performance due to a wrong beam direction and a corresponding precoding CSI-RS.

In order to address the above-described problem, the present invention proposes a technique of adapting the serving beams through a precoded SRS. The base station may use precoded SRS ports transmitted by the UE for serving beam adaptation of serving beams, for calculation of downlink precoding without CSI feedback, or for announcement of precoding in uplink transmission of the UE. Accordingly, using at least one of first to fifth embodiments described below, the UE may transmit an SRS by applying precoding based on the present invention in the operation of SRS transmission.

First Embodiment

According to a first embodiment of the present invention, in selecting precoding, the UE calculates a receive vector on the assumption that the base station will transmit the most recently selected serving beam (or the best serving beam among the most recently measured serving beams), and then transmits an SRS configuring S ports using the receive vector as precoding for the SRS.

Alternatively, in the case where the UE has sent a previous non-precoded SRS, the base station calculates uplink precoding based on the received non-precoded SRS and signals the same to the UE, and the UE configures S ports using the signaled precoding to transmit an SRS.

Here, the value of S may be predefined or may be semi-statically indicated through RRC signaling or dynamically indicated on a control channel.

Second Embodiment

According to a second embodiment of the present invention, in selecting precoding, UE calculates a receive vector for each of the beams (wherein the receive vector may be based on an analog beam or a hybrid beam combining an analog beam and a digital beam, or may be precoding applied to only some antenna groups) on the assumption that the base station will transmit L beams including the most recently selected serving beam (or the best serving beam among the most recently measured serving beams) and neighboring beams (i.e., beams neighboring the best serving beam), and transmits an SRS by configuring L ports with precoding based on the determined receive vector. After the base station receives the SRS for the L ports, the base station may perform the adaptation operation only on the serving beam.

According to this embodiment, a reference for a set of neighboring beams selected in conjunction with the most recently selected serving beam (or the best serving beam among the most recently measured serving beams) is configured by the base station through RRC. At this time, the value of L may also be configured. Alternatively, the reference may be dynamically indicated on a control channel. For example, the reference may be indicated when the SRS is triggered on the control channel Since the UE is aware of the most recently selected serving beam (or the best serving beam among the most recently measured serving beams), the UE selects a beam set for SRS transmission according to an associated beam set selection rule based on the serving beam.

For example, the base station may establish a configuration such that one or more neighboring beams (e.g., five beams including two beams on the left side and two beams on the right side) that are closest to the recently selected serving beam are considered in SRS transmission. Here, the proximity of the serving beam to the neighboring beams may be determined based on whether the correlation is higher than or equal to a predetermined reference. The reference for the correlation may be preconfigured or dynamically preconfigured through higher layer signaling or a control channel.

In another example, upon recognizing that the serving beams are consistently changed to a specific side (e.g., the right side), the base station may configure the recently selected serving beam and four beams on the specific side (i.e., the right side).

Alternatively, the beams of the base station and the transmission ports of the SRS may be pre-mapped in one-to-one correspondence, such that the base station can recognize beams corresponding to the ports of the SRS transmitted by the UE. The base station may know a beam associated with an SRS port precoded by the UE according to the one-to-one mapping relationship. Upon receiving this information, the base station may use the received information to calculate a receive vector. Here, the one-to-one mapping between the beams and the SRS transmission ports may be configured through RRC and semi-statically changed. Alternatively, the one-to-one mapping may be dynamically changed over a control channel.

In another example according to this embodiment, since the recently selected serving beam is known to the base station, the base station may directly indicate beam indexes through RRC to allow the UE to configure a set of beams for SRS transmission for any serving beam the UE has selected. Alternatively, the base station may dynamically indicate the beam indexes on the control channel. For example, the base station indicate the beam indexes in triggering an SRS (and may also configure the value of L). This scheme may be suitable for an operation in which the base station selectively excludes some beams to allow uplink precoding selection for the UE considering neighboring cell downlink interference. Here, the beam indexes may be sequentially numbered in a specific direction, and thus the indexes of a specific serving beam and neighboring beams may be consecutively configured. For example, when the index of the leftmost beam among the beams configured in a horizontal arrangement is a, the indexes may be configured in order as a+1, a+2, . . . in the rightward direction.

In another example according to this embodiment, in selecting precoding for SRS transmission, the UE transmits SRSs for L ports using a set of L receive vectors signaled for precoding by the base station. In this case, a codebook may be used to inform the UE of the indexes. Alternatively, precoding applied to each previous precoded SRS port may be indicated, such that the base station may select the precoding used for the precoded SRS sent by the UE even when the base station does not recognize the specific precoding value. For example, the base station may make a request to the UE for a previous non-precoded SRS and cause a receive vector calculated based on the non-precoded SRS to be used in transmitting a subsequent precoded SRS. In this case, a precoding value may be selected in the codebook and signaled to the UE.

In another example according to this embodiment, in selecting precoding for SRS transmission, a receive vector may be calculated and used for SRS precoding to transmit L SRS ports, on the assumption that the base station uses the L best serving beams for the UE among the most recently measured serving beams. Whether to use such operation may be predefined or may be semi-statically announced through RRC signaling or dynamically announced on the control channel.

In yet another example according to this embodiment, in downlink transmission, the base station may indicate, on a control channel associated with the downlink transmission, the serving beam used by the base station. Alternatively, the base station may semi-statically inform the UE of what the serving beam has changed to, through RRC. In this case, indexes only in a precoding set sent over the previous precoded SRS may be indicated.

In yet another example according to this embodiment, in selecting precoding, when the UE or the base station determines that the serving beams are changed excessively quickly, the SRS may be configured using precoding selected by the UE. Herein, the determination that the serving beams are changed quickly may be indicated by the base station, or may be signaled by the base station such that the UE makes a selection. Such indication or signaling may be semi-statically configured through RRC signaling or dynamically announced on the control channel at the time of SRS triggering.

Accordingly, when it is determined that the serving beams are changed quickly, the base station may cyclically use the serving beams on a resource group-by-resource group basis (or resource element-by resource element basis) using ports of M serving beams among the L serving beams received from the UE in downlink transmission. In this case, the M serving beams which are used may be announced to the UE using the ports of the SRS transmitted by the UE. In other words, in the case where the UE has transmitted an SRS to the base station by performing precoding with four receive vectors using four SRS ports of SRS ports 0, 1, 2, and 3, the base station may inform the UE that serving beams aligned with SRS ports 1 and 2 are cyclically used. The UE may apply, to the respective serving beams of the base station, the receive vectors transmitted through SRS ports 1 and 2. Alternatively, for a base station designed to use only N serving beams at the same time (e.g., a base station that forms serving beams with a phase shifter configured in consideration of application of analog beamforming), only SRS ports to which the N serving beams are applied may be used at one time, and M serving beams may be cyclically transmitted on the entire resources.

Alternatively, when it is determined that serving beams are changed quickly, the base station may apply a spatial-time coding scheme or a spatial-frequency coding scheme to the serving beams on a resource group-by-resource group basis (or resource element-by resource element basis) in downlink transmission, using ports of M serving beams among the L serving beams received from the UE. In this case, the M serving beams which are used may be announced to the UE using the ports of the SRS transmitted by the UE. In other words, in the case where the UE has transmitted an SRS to the base station using SRS ports 0, 1, 2, and 3 by performing precoding with four receive vectors, the base station may inform the UE that the serving beams aligned with SRS ports 1 and 2 are transmitted through 2-antenna spatial-frequency block coding (SFBC). The UE may apply, to each of the serving beams of the base station, the receive vectors transmitted through SRS ports 1 and 2.

Third Embodiment

According to a third embodiment of the present invention, in selecting precoding, the UE assumes that the base station will transmit L beams including the most recently selected serving beam (or the best serving beam among the most recently measured serving beams) and neighboring beams. Thus, the UE calculates a receive vector for each of the beams (wherein the receive vector may be based on an analog beam or a hybrid beam combining an analog beam and a digital beam, or multiple ports may be configured by applying precoding applied to only some antenna groups to different antenna groups), configures $S_i$ (where i=0, 1, 2, . . . , L−1) ports for each serving beam considering the calculated receive vectors as precoding, and transmits an SRS for $$\sum_i S_i$$

ports in total.

In one example according to the this embodiment, a reference for a set of neighboring beams selected in conjunction with the most recently selected serving beam (or the best serving beam among the most recently measured serving beams) is configured by the base station through RRC. At this time, the value of L may also be configured. Alternatively, the reference may be dynamically indicated on a control channel. For example, the reference may be indicated when an SRS is triggered on the control channel Since the UE is aware of the serving beam that the UE has most recently selected, the UE selects a beam set for SRS transmission according to an associated beam selection rule based on the serving beam.

For example, the base station may establish a configuration such that one or more neighboring beams (e.g., five beams including two beams on the left side and two beams on the right side) that are closest to the recently selected serving beam (or the best serving beam of the most recently measured serving beam) are considered in SRS transmission. Here, the proximity of the serving beam to the neighboring beams may be determined based on whether the correlation is higher than or equal to a predetermined reference. The reference for the correlation may be preconfigured or dynamically configured through higher layer signaling or a control channel. In another example, upon recognizing that the serving beams are consistently changed to a specific side (e.g., the right side), the base station may configure the recently selected serving beam and four beams on the specific side (i.e., the right side).

Alternatively, the serving beams of the base station and the transmission port of the SRS may be pre-mapped in one-to-one correspondence, such that the base station can recognize beams corresponding to the ports of the SRS transmitted by the UE among the serving beams. The base station may know a beam associated with an SRS port precoded by the UE according to the one-to-one mapping relationship. Upon receiving this information, the base station may use the received information to calculate a receive vector. Further, the one-to-one mapping between the serving beams and the transmission ports of the SRS may be configured through RRC and semi-statically changed. Alternatively, the one-to-one mapping may be dynamically changed over a control channel.

In still another example according to this embodiment, since the recently selected serving beam is known to the base station, the base station may directly indicate beam indexes through RRC to allow the UE to configure a set of beams for SRS transmission regardless of the serving beam the UE has selected. Alternatively, the base station may dynamically indicate the beam indexes on the control channel. For example, the base station may indicate the beam indexes in triggering an SRS (and the value of L may also be configured). This scheme may be suitable for an operation in which the base station selectively excludes some serving beams to allow uplink precoding selection of the UE considering neighboring cell downlink interference. Here, the beam indexes may be sequentially numbered in a specific direction, and thus the indexes of a specific serving beam and the neighboring beams may be consecutively configured. For example, when the index of the leftmost beam among the beams configured in a horizontal arrangement is a, the indexes may be configured in order as a+1, a+2, . . . in the rightward direction.

In yet another example according to this embodiment, in selecting precoding for SRS transmission, the UE transmits SRSs for $$\sum_i S_i$$

ports using a set of receive vectors signaled for precoding by the base station. In this case, a codebook may be used to inform the UE of the indexes. Alternatively, precoding applied to each previous precoded SRS port may be indicated to indicate the precoding used for the precoded SRS sent by the UE even when the base station does not recognize the specific precoding value. In this case, the base station may make a request to the UE for a previous non-precoded SRS and cause a receive vector calculated based on the non-precoded SRS to be used in transmitting a subsequent precoded SRS. In this case, a precoding value may be selected in the codebook and signaled to the UE.

In yet another example according to this embodiment, in selecting precoding for SRS transmission, a receive vector may be calculated and used for SRS precoding to transmit an SRS for $$\sum_i S_i$$

ports, on the assumption that the base station uses the L best serving beams for the UE among the most recently measured serving beams. Whether to use such operation may be predefined or may be semi-statically announced through RRC signaling or dynamically announced on the control channel.

In yet another example according to this embodiment, in downlink transmission, the base station may indicate, on a control channel associated with the downlink transmission, the serving beam used by the base station. Alternatively, the base station may semi-statically inform the UE of what the serving beam has changed to, through RRC. In this case, indexes only in a precoding set sent over the previous precoded SRS may be indicated.

In yet another example according to this embodiment, in selecting precoding, when the UE or the base station determines that the serving beams are changed excessively quickly, the SRS may be configured using precoding selected by the UE. Herein, the determination that the serving beams are changed quickly may be indicated by the base station, or may be signaled by the base station such that the UE makes a selection. Such indication or signaling may be semi-statically configured through RRC signaling or dynamically announced on the control channel at the time of SRS triggering.

Accordingly, when it is determined that the serving beams are changed quickly, the base station may cyclically use serving beams on a resource group-by-resource group basis (or resource element-by resource element basis) using M ports among the $$\sum_i S_i$$

ports associated with the L serving beams received from the UE in the downlink transmission. In this case, the M ports which are used may be announced to the UE using the ports of the SRS transmitted by the UE. In other words, in the case where the UE has transmitted an SRS to the base station by performing precoding with four receive vectors using four SRS ports of SRS ports 0, 1, 2, and 3, the base station may inform the UE that serving beams aligned with SRS ports 1 and 2 are cyclically used. The UE may apply, to the respective serving beams of the base station, the receive vectors transmitted through SRS ports 1 and 2. Alternatively, only M serving beams may be selected and indicated and it may be implicitly announced that all SRS ports considering each serving beam will be subjected to cyclic precoding. In this case, for a base station designed to use only N serving beams at the same time (e.g., a base station that forms a wide beam with a phase shifter configured in consideration of application of analog beamforming), only SRS ports to which the N serving beams are applied may be used in one time interval, and M serving beams may be cyclically transmitted on the entire resources.

In addition, when it is determined that serving beams are changed quickly, the base station may apply a spatial-time coding scheme or a spatial-frequency coding scheme to the serving beams on a resource group-by-resource group basis (or resource element-by resource element basis) in downlink transmission, using M ports among the $$\sum_i S_i$$

ports. In this case, M serving beams which are used may be announced to the UE using the ports of the SRS transmitted by the UE. In other words, in the case where the UE has transmitted an SRS to the base station by performing precoding with four receive vectors using four SRS ports of SRS ports 0, 1, 2, and 3, the base station may inform the UE that serving beams aligned with SRS ports 1 and 2 are transmitted through 2-antenna SFBC. The UE may apply, to the respective serving beams of the base station, the receive vectors transmitted through SRS ports 1 and 2.

In yet another example according to this embodiment, the value of S, may be predefined or may be semi-statically indicated through RRC signaling or dynamically indicated on a control channel.

According to the second embodiment of the present invention described above, the base station may perform an operation of adapting the serving beams. Alternatively, according to the third embodiment of the present invention, the base station may adapt the serving beams, and may also estimate short-term precoding without receiving CSI. Alternatively, the base station may inform the UE of the optimum uplink precoding recognized using the second embodiment or the third embodiment of the present invention. Alternatively, the base station may obtain an optimum uplink precoding set recognized using the second embodiment or the third embodiment of the present invention, and inform the UE that the UE should use the uplink precoding set indicated to the UE in uplink transmission by cycling the precoding set. Details will be described in a fourth embodiment and a fifth embodiment below.

Fourth Embodiment

The fourth embodiment of the present invention will be described on the premise that the UE assumes that the base station will transmit L beams of serving beams and neighboring beams according to the second embodiment described above.

In this embodiment, when it is determined that the serving beams are changed quickly, the base station may instruct that uplink precoding should be cyclically used on a resource group-by-resource group basis (or resource element-by resource element basis) in uplink transmission using M ports among the L SRS ports received from the UE, wherein the base station may allow the UE to select such process according to the speed of the UE or may instruct the UE to select the process. Then, the UE performs the uplink transmission by performing one-to-one mapping of the SRS ports indicated by the base station to predefined uplink ports (or uplink ports indicated through RRC signaling or a control channel).

Alternatively, in uplink transmission, the base station may apply a spatial-time coding scheme or a spatial-frequency coding scheme to uplink precoding on a resource group-by-resource group basis (or resource element-by resource element basis) using M SRS ports among the L SRS ports received from the UE, wherein the base station may allow the UE to select such process according to the speed of the UE or may instruct the UE to select the process. Then, the UE performs the uplink transmission by performing one-to-one mapping of the SRS ports indicated by the base station to predefined uplink ports (or uplink ports indicated through RRC signaling or a control channel).

Fifth Embodiment

The fifth embodiment of the present invention will be described on the premise that the UE calculates a receive vector and transmits an SRS for $$\sum_i s_i$$

ports based on the calculated receive vector, assuming that the base station will transmit L beams of serving beams and neighboring beams according to the third embodiment described above.

In the fifth embodiment, when it is determined that the serving beams are changed quickly, the base station may instruct that uplink precoding should be cyclically applied on a resource group-by-resource group basis (or resource element-by resource element basis) in uplink transmission using M ports among the L ports received from the UE, wherein the base station may allow the UE to select such process according to the speed of the UE or may instruct the UE to select the process. Then, the UE performs the uplink transmission by performing one-to-one mapping of the SRS ports indicated by the base station to predefined uplink ports (or uplink ports indicated through RRC signaling or a control channel).

Alternatively, in uplink transmission, the base station may apply a spatial-time coding scheme or a spatial-frequency coding scheme to uplink precoding on a resource group-by-resource group basis (or resource element-by resource element basis) using M SRS ports among the L ports received from the UE, wherein the base station may allow the UE to select such process according to the speed of the UE or may instruct the UE to select the process. Then, the UE performs the uplink transmission by performing one-to-one mapping of the SRS ports indicated by the base station to predefined uplink ports (or uplink ports indicated through RRC signaling or a control channel).

The above-described embodiments of the present invention may be configured such that one or more embodiments are used in combination. For example, the base station may be operated in two steps in which the base station recognizes a serving beam optimized through the second embodiment, and configures a less value of L in the first embodiment (L=1) or the third embodiment (e.g., L=1 obtained by applying one serving beam optimized in the second embodiment) for UE, such that short term precoding through the S, ports for every L beams is also recognized.

Furthermore, in the first to third embodiments of the present invention, the UE may consider interference to a neighboring cell. When it is determined that a precoded SRS port transmitted by the UE acts as interference to a neighboring cell, the UE may be caused to drop the port or lower the power to or below a certain level to transmit the power of the port. Measurement of such neighboring cell interference may be performed through a reference signal (RS) transmitted from the neighboring cell and the neighboring cell interference may be determined based on whether the interference is greater than or equal to or less than or equal to a predetermined threshold value. The threshold value may be predefined or may be semi-statically configured by the base station through RRC signaling. When the power of the SRS port determined to be the interference is lowered, it may be defined that the measured value should be lowered so as to be less than or equal to the defined threshold value (or another value configured through RRC signaling). In forming SRS ports, signaling about whether the UE should exclude an SRS port acting as the neighboring cell interference or lower the power of the SRS port may be configured through RRC signaling.

In transmitting uplink signals by precoding the receive vectors of the UEs suitable for the serving beams, beam separation may be performed when the serving beams are different. Accordingly, for the different serving beams, the precoded uplink signals of the UEs are allowed to use the same sequence.

Therefore, for sequences of uplink signals, when receive vectors assumed to have the same serving beam are used for precoding, the uplink signals may only need to be designed to have different sequences. However, when receive vectors considering multiple beam sets are used for precoding as in the present invention, the situation may be slightly different. In this case, it is necessary to explicitly indicate that a different sequence should be used for each serving beam between the uplink precodings considering different serving beams. Otherwise, sequence conflict may suddenly occur between the different serving beams when a UE that has transmitted a precoded uplink signal considering only one serving beam uses the same sequence for multiple serving beams. Accordingly, in the present invention, it is more effective that a sequence of precoded signals for each serving beam is randomized according to the serving beam ID. Such sequence information may be indicated by the base station semi-statically through RRC signaling or dynamically on the control channel.

In order to fundamentally avoid the above-described issue, it is proposed that, when the precoded uplink signals are precoded in consideration of multiple sets of serving beams as in the present invention, a new sequence different from the uplink signals considering one serving beam be used. Such sequence information may be indicated by the base station semi-statically through RRC signaling or dynamically on the control channel. Alternatively, when a precoded SRS is used, a new SRS resource for fallback may be defined and used if a transmission is performed considering two or more serving beams.

Figure 5:
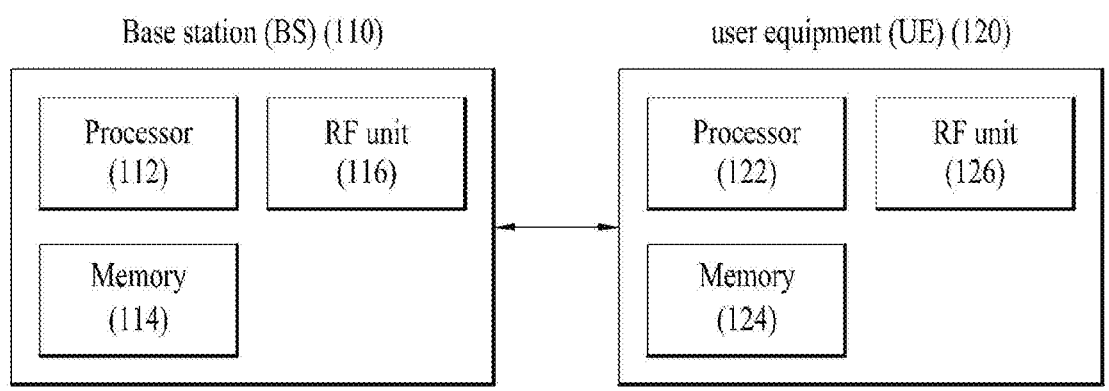
FIG. 5 illustrates a base station and a UE to which the present invention is applicable.

FIG. 5 illustrates a base station (BS) and a UE applicable to an embodiment of the present invention.

When a wireless communication system includes a relay, communication is performed between a BS and the relay on a backhaul link and communication is performed between the relay and a UE on an access link. Accordingly, the BS or UE shown in the figure may be replaced by the relay as necessary.

Referring to FIG. 5, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124 and a radio frequency (RF) unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described method for transmitting a signal in a wireless communication system and the apparatus for the same are applicable to various wireless communication systems.

The invention claimed is:

1. A method for transmitting a signal by a user equipment (UE) in a wireless communication system supporting Multiple Input Multiple Output (MIMO), the method comprising:
    transmitting, to a base station (BS), a non-precoded sounding reference signal (SRS);
    transmitting, to the BS, first information of a serving beam selected based on a reference signal;
    receiving, from the BS, (i) second information related to N beams including the serving beam and (ii) third information related to N ports for transmitting of a SRS;
    obtaining, from the BS, receive vectors for the N beams;
    measuring an interference of Reference Signals (RSs) of a neighbor cell associated with each of N ports; and
    transmitting, to the BS, the SRS utilizing the N Ports associated with the N beams by applying precoding based on the receive vectors,
    wherein the N beams are determined based on a direction of change of the serving beam,
    wherein the receive vectors are determined based on the non-precoded SRS,
    wherein each of the N ports is associated with each of the N beams, N is positive integer,
    wherein, based on the third information indicating a first operation, a SRS for a first port, of the SRS transmitted utilizing the N Ports, is transmitted with a transmission power equal to or less than a first threshold,
    wherein, based on the third information indicating a second operation, the SRS for the first port is not transmitted,
    wherein the first port is associated with a RS of the neighbor cell having an interference higher than a second threshold, and
    wherein the first threshold and the second threshold are different from each other.

2. The method according to claim 1, wherein the N beams comprise the serving beam and at least one neighboring beam neighboring the serving beam.

3. The method according to claim 1, wherein the N beams are indicated by an index received from the BS.

4. The method according to claim 1, further comprising:
    performing uplink precoding by cycling the N ports on a resource group-by-resource group basis.

5. A user equipment (UE) for transmitting a signal in a wireless communication system supporting Multiple Input Multiple Output (MIMO), the UE comprising:
    a radio frequency circuit; and
    a processor coupled to the radio frequency circuit to control signal transmission and reception,
    wherein the processor is configured to:
    transmit, to a base station (BS), non-precoded sounding reference signal (SRS);
    transmit, to the BS, first information of a serving beam selected based on a reference signal;
    receive, from the BS, (i) second information related to N beams including the serving beam and (ii) third information related to N ports for transmitting of a SRS;
    obtain, from the BS, receive vectors for the N beams;
    measure an interference of Reference Signals (RSs) of a neighbor cell associated with each of N ports; and
    transmit, to the BS, the SRS utilizing the N Ports associated with the N beams by applying precoding based on the receive vectors,
    wherein the N beams are determined based on a direction of change of the serving beam, wherein the receive vectors are determined based on the non-precoded SRS, wherein each of the N ports is associated with each of the N beams, N is positive integer, wherein, based on the third information indicating a first operation, a SRS for a first port, of the SRS transmitted utilizing the N Ports, is transmitted with a transmission power equal to or less than a first threshold, wherein, based on the third information indicating a second operation, the SRS for the first port is not transmitted, wherein the first port is associated with a RS of the neighbor cell having an interference higher than a second threshold, and wherein the first threshold and the second threshold are different from each other.

\* \* \* \* \*